(12) United States Patent  
Iwamura (10) Patent No.: US 7,797,711 B2
(45) Date of Patent: Sep. 14, 2010

(54) GRAPHICAL USER INTERFACE FOR A DEVICE HAVING MULTIPLE INPUT AND OUTPUT NODES

(75) Inventor: Ryuichi Iwamura, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1470 days.

(21) Appl. No.: 10/095,947

(22) Filed: Mar. 11, 2002

(65) Prior Publication Data

US 2004/0055006 A1 Mar. 18, 2004

(51) Int. Cl.
*G06F 3/00* (2006.01)
*G06F 13/00* (2006.01)
*H04N 5/445* (2006.01)
*G09G 5/00* (2006.01)

(52) U.S. Cl. ............................ 725/37; 725/38; 345/619
(58) Field of Classification Search ................. 725/59
See application file for complete search history.

(56) References Cited

U.S. PATENT DOCUMENTS 5,261,044 A   11/1993  Dev et al. ................... 395/159
5,883,621 A   3/1999   Iwamura ..................... 345/327
6,219,839 B1* 4/2001   Sampsell ..................... 725/40
6,321,382 B1  11/2001  Wugofski .................... 725/59
6,519,540 B1* 2/2003   Salandro ..................... 702/68
6,753,928 B1* 6/2004   Gospel et al. ............... 348/569
2001/0052946 A1* 12/2001 Sato .......................... 348/706

* cited by examiner

*Primary Examiner*—Joseph P Hirl
*Assistant Examiner*—Fred Peng (57) ABSTRACT

A graphical user interface (GUI) is described. The GUI includes first GUI elements that provide a visual representation of the nodes of an audio/video device. In response to user input, a signal is caused to be routed between nodes by manipulating circuitry within the audio/video device. Second GUI elements provide a visual representation of the signals being routed within the electronic device between pairs of first GUI elements (e.g., between nodes). As a result, the user can readily understand which nodes are connected to each other. Thus, for example, a user can easily visualize which source node is providing input to a target node and, by selecting the appropriate GUI elements, can just as easily switch from one source to another or from one target to another.

31 Claims, 7 Drawing Sheets

GRAPHICAL USER INTERFACE FOR A DEVICE HAVING MULTIPLE INPUT AND OUTPUT NODES

TECHNICAL FIELD

The present invention relates to the field of graphical user interfaces. In particular, the present invention pertains to a graphical user interface for visualizing and controlling signal flows within a device.

BACKGROUND ART

Inputs to a television conventionally include signals received via an antenna, a satellite system, or cable. Some televisions are equipped with more than one tuner, allowing a viewer to select from more than one source. In addition, televisions are typically equipped with several input (or source) nodes, allowing the television to receive inputs from multiple devices such as video cassette recorders (VCRs), digital video disk (DVD) players, and even personal computers. Thus, contemporary televisions have the capability to receive inputs from multiple sources and from many different types of peripheral devices.

Similarly, contemporary televisions are equipped with multiple output (or target) nodes to which a signal from a source node can be directed. These target nodes include peripheral devices (such as VCRs and also digital recording devices) that can be used to record an input signal. The television's display device (e.g., the television screen) can also be thought of as a target node.

The modern viewer is thus confronted with a somewhat bewildering number of choices regarding which input is to be viewed and/or recorded, and which target node is to be used for viewing and/or recording. Typically, the viewer attempts to make his or her selections using a remote control (or remote commander) in conjunction with some type of user interface that is displayed on the television's screen.

However, a problem with prior art user interfaces is that only the source name is presented to the user. In addition, the source name is typically a relatively obscure name, such as "Video 1" or "S-video," that does not provide an indication of the type of device that is connected with the input node.

Consider, for example, a situation in which a first tuner is receiving a broadcast program and the user wishes to send this to a VCR for recording. Separately, two videos are being displayed on the television screen—one video from "Video 1" which may be a DVD player, the other from a second tuner—and the user wishes to select one of these videos for viewing. Using a conventional user interface, selecting the various inputs and directing them to the correct target can be difficult. In general, the user would likely need to know how the television and peripheral devices were set up (that is, which input node is connected with which peripheral device) in order to identify the correct source. In addition, the user would need to know how the VCR is identified and that the DVD player is identified as "Video 1."

In summary, while television designs have advanced to where inputs can be received from multiple sources and to where those inputs can be directed to a variety of target nodes, prior art user interfaces have not kept pace. Prior art techniques for managing connections between source and target nodes are generally unwieldy when applied to televisions that provide users with a multiplicity of choices.

SUMMARY OF THE INVENTION

Therefore, what is needed is a system and/or method that can help users control a device (such as a television or set top box) that has multiple source nodes and multiple target nodes. In particular, what is needed is a system and/or method that can help users direct a signal from a desired source node to a desired target node.

Embodiments of the present invention pertain to graphical user interfaces (GUIs) that can satisfy these needs. The GUIs provide a visualization of the video and audio signal flows inside a television or set top box so that a user can easily control the signals, routing them from a selected source node to a selected target node. The features of the present invention can be extended to other types of devices having multiple source and target nodes (generally speaking, an audio/video device).

In one embodiment, the GUI includes first GUI elements that provide a visual representation of the nodes of an audio/video (A/V) device. In response to user input, a signal is caused to be routed between nodes by manipulating circuitry within the A/V device. Second GUI elements provide a visual representation of the signals being routed within the A/V device between pairs of first GUI elements (e.g., between a source and a target node).

In its various embodiments, the GUI can be implemented in software and thus can be incorporated into conventional or legacy devices; that is, embodiments of the present invention can be implemented without the necessity of hardware modifications.

According to the present invention, a user can readily understand which nodes of an A/V device are connected to each other. Thus, for example, a user can easily visualize which source node is providing input to a target node and, by selecting the appropriate GUI elements, can just as easily switch from one source to another or from one target to another. These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer system memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "selecting," "routing," "rendering," "manipulating," "detecting," "generating" or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems, such as, for example, optical and mechanical computers.

The present invention is discussed in the general context of a television or set top box. However, it is appreciated that the features of the present invention can be used with other types of devices having multiple input (source) nodes and multiple destination (target or output) nodes. These devices are generally referred to herein as audio/video devices, and they typically include a video system for managing video signals and an audio system for managing audio signals associated with the video signals.

Figure 1:
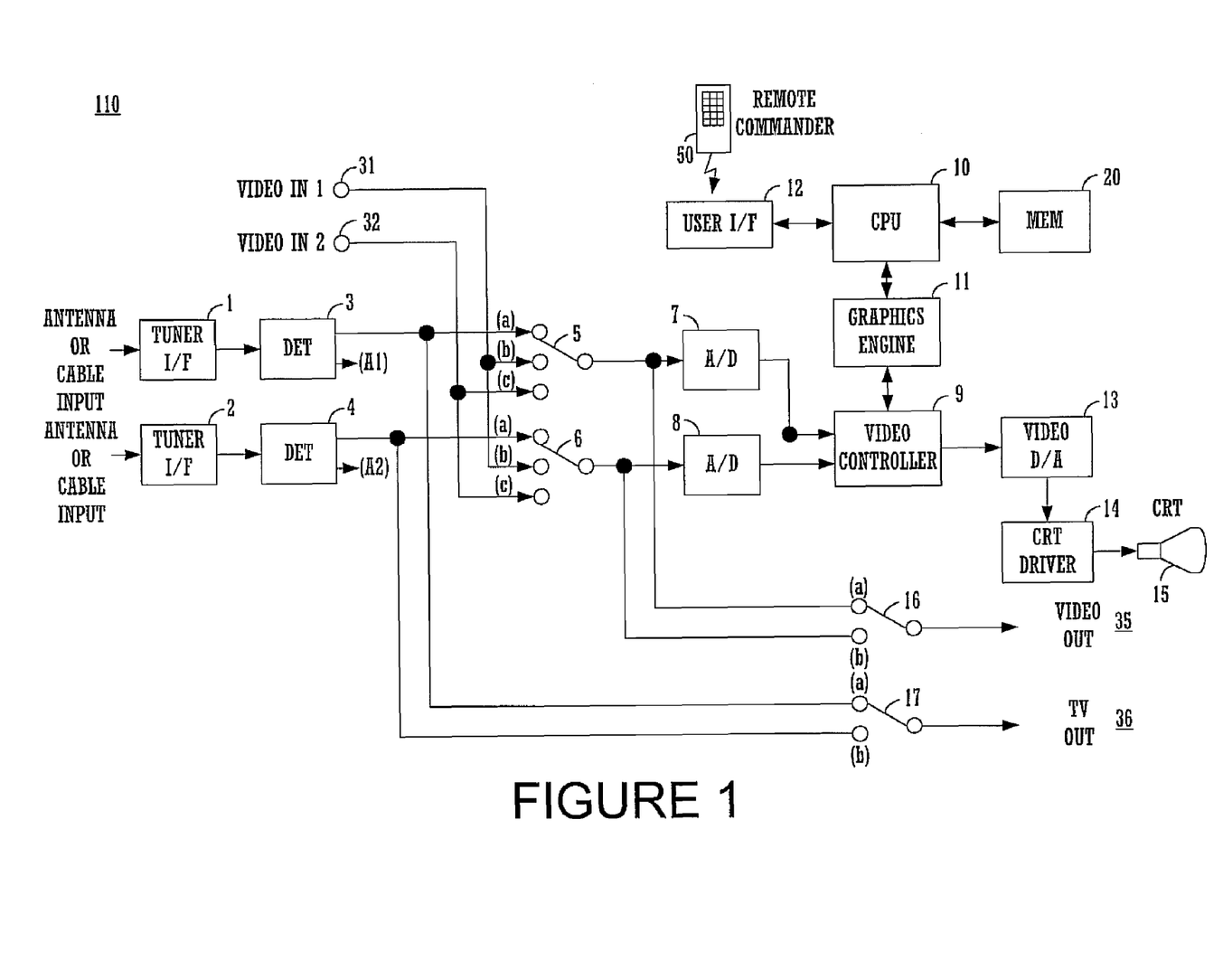
FIG. 1 is a block diagram of one embodiment of a video system upon which embodiments of the present invention may be implemented.

FIG. 1 is a block diagram of one embodiment of a video system 110 upon which embodiments of the present invention may be implemented. Embodiments of the present invention can be implemented in software; for those embodiments, video system 110 simply illustrates an exemplary platform to which embodiments of the present invention can be applied. In one embodiment, video system 110 is implemented in a television. Alternatively, aspects of video system 110 may be implemented in a peripheral device, such as a set top box, that is coupled to a television. In general, video system 110 shows various functional elements that can be either included in a single device or distributed among multiple devices that are coupled to one another. It is appreciated that alternatives to the elements of video display system may be used; for example, different types of display devices other than cathode ray tubes (CRTs) may be used. It is also appreciated that not all of the elements of video system 110 need be present; for example, video system 110 may include a single tuner instead of multiple tuners.

In the embodiment of FIG. 1, signals from an antenna, a cable, a satellite broadcast, or the like, are received by tuner/IF (interface) 1 and by another tuner/IF 2. Detector blocks (DET) 3 and 4 separate these signals into video signals and audio signals (the audio signals are designated A1 and A2, and are discussed further in conjunction with FIG. 2 below). In one embodiment, the video signals are NTSC (National Television Standards Committee) signals. In the present embodiment, the video signals go to switches 5 and 6.

Continuing with reference to FIG. 1, video system 110 also includes multiple video input ports 31 and 32 (video in 1 and video in 2). The video input ports 31 and 32 are for coupling video system 110 to peripheral devices such as VCRs, DVD players, personal computers and the like. Video signals received via ports 31 and 32 also go to switches 5 and 6. It is appreciated that some number of video input ports other than two may be used with the present invention.

In the present embodiment, the switches 5 and 6 are used for selecting a signal from tuner I/F 1, tuner I/F 2, video input port 31 or video input port 32. The selected signals are converted from analog to digital in analog-to-digital (A/D) converters 7 and 8 and sent to video controller 9. Graphics generated by graphics engine 11 are mixed with the respective digital signals by video controller 9. Video controller 9 can also reduce the video signals to smaller sizes.

The signals from video controller 9 are converted from digital to analog in digital-to-analog (D/A) converter 13. The resulting analog signals are sent to CRT driver 14 and displayed on CRT 15. Switch 16 selects a video signal from switch 5 or from switch 6, and switch 17 selects a video signal from DET 3 or 4. The signal selected by switch 16 is sent to the video output port 35, and the signal selected by switch 17 is sent to the television (TV) output port 36.

Thus, in the present embodiment, tuner I/F 1, tuner I/F 2, and video input ports 31 and 32 represent source nodes of the video system 110, while CRT 15, video output port 35, and TV output port 36 represent target nodes of video system 110. It is appreciated that more than or less than three target nodes may be used with the present invention.

In the present embodiment, video system 110 is under control of a processor (CPU) 10. User interface (I/F) 12 receives a command from a remote control (remote commander 50) that is under control of a user. The command is forwarded to CPU 10, which controls the tuners and switches of video system 110 according to the command. Software including program code and instructions for CPU 10 are stored in memory (Mem) 20.

Figure 2:
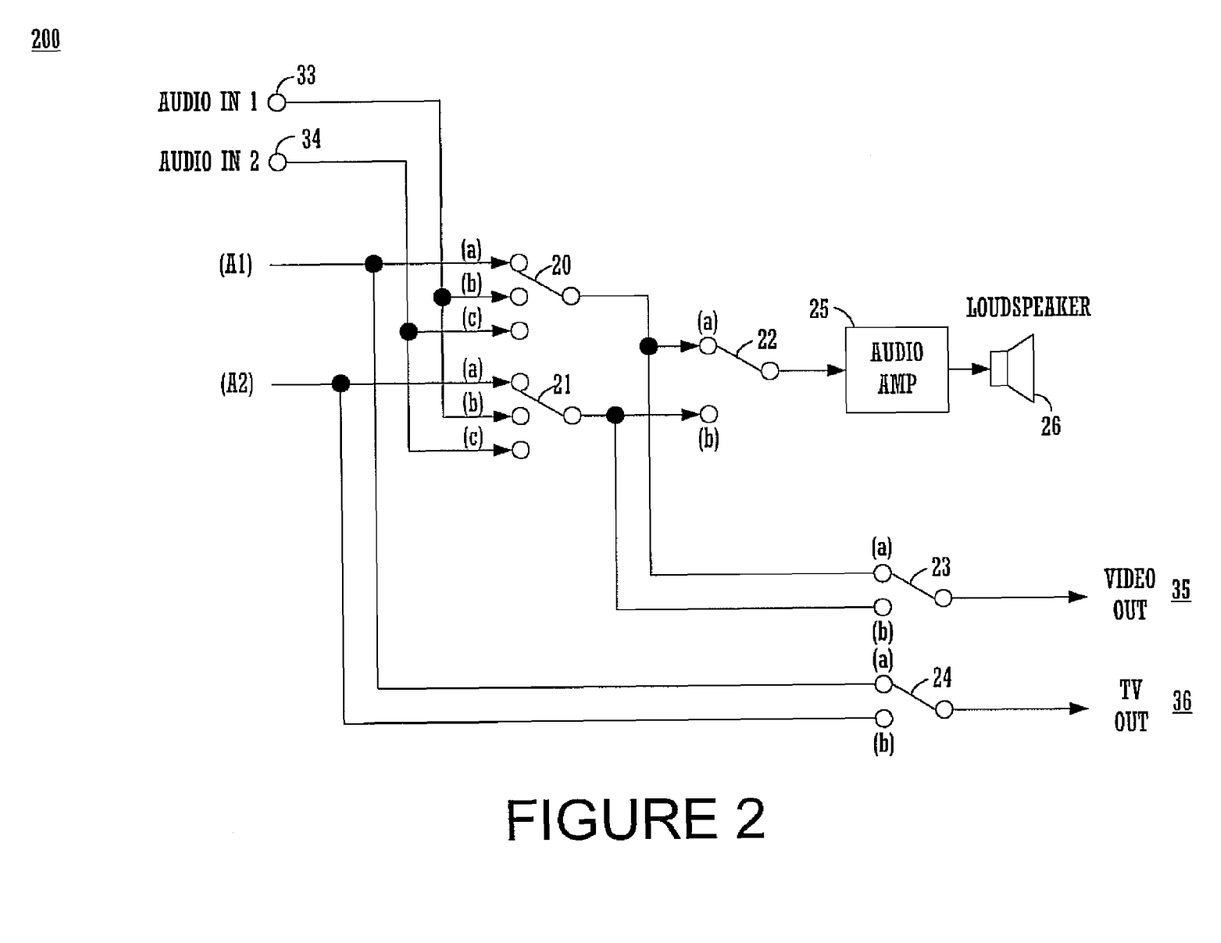
FIG. 2 is a block diagram of one embodiment of an audio system upon which embodiments of the present invention may be implemented.

FIG. 2 is a block diagram of one embodiment of an audio system 200 upon which embodiments of the present invention may be implemented. In the present embodiment, the audio signals A1 and A2 (see also FIG. 1 above) are received at switches 20 and 21. The switches 20 and 21 work together with switches 5 and 6 of FIG. 1. Similarly, switches 23 and 24 work together with switches 16 and 17 of FIG. 1. Thus, for example, if switch 5 is set to receive the video signal from tuner I/F 1, then switch 20 will be set to receive audio signal A1, which is also from tuner I/F 1. Audio system 200 also includes audio input ports 33 and 34 (audio in 1 and audio in 2), which correspond to the video input ports 31 and 32.

Continuing with reference to FIG. 2, switch 22 selects either the output of switch 20 or the output of switch 21. The selected audio signal is amplified in audio amplifier 25 and sent to loudspeaker 26. Note that, although it is possible to simultaneously display two videos, two audio signals cannot be simultaneously played, so that one of the audio signals A1 or A2 needs to be selected.

Figure 3:
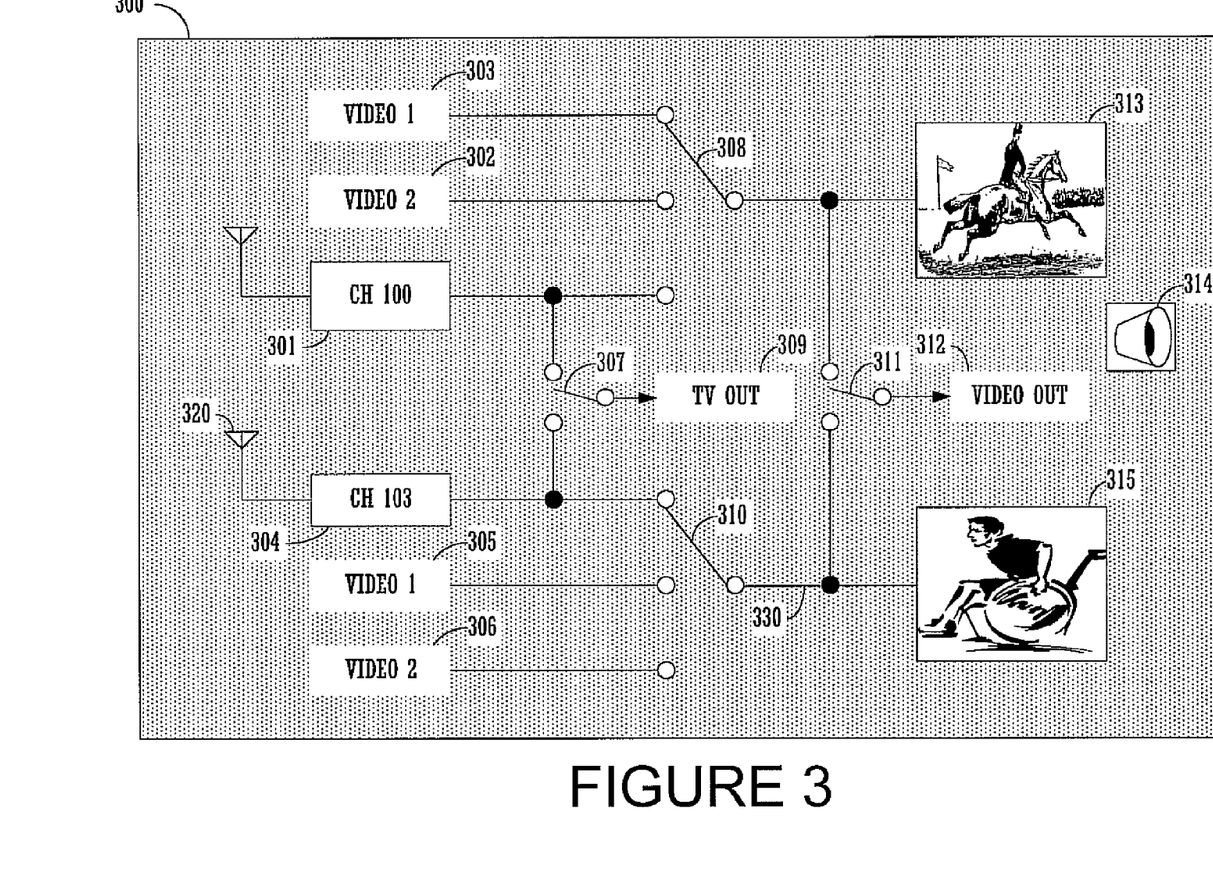
FIG. 3 illustrates one embodiment of a graphical user interface in accordance with the present invention.

FIG. 3 illustrates one embodiment of a graphical user interface (GUI) 300 in accordance with the present invention. The implementation of GUI 300 is described in the context of video system 110 and audio system 200 of FIGS. 1 and 2, respectively; however, as will be seen, the features of GUI 300 can be implemented on different types of systems. For example, GUI 300 can be readily extrapolated to an application that has some number of tuners other than two, or that has some number of video input ports other than two (and hence may include some number of peripheral devices other than two).

In the present embodiment, GUI 300 is implemented in software as computer-readable and computer-executable instructions executed by a processor (e.g., CPU 10 of FIG. 1). The computer-readable and computer-executable instructions may reside in memory 20 of FIG. 1. However, it is understood that the computer-readable and computer-executable instructions may instead reside in a memory device and/or may be executed by a processor separate from, but coupled to, video system 110 of FIG. 1.

With reference to FIG. 3 and also to FIG. 1, in the present embodiment, GUI 300 is essentially a topographical representation of video system 110; that is, GUI 300 essentially renders a visual representation of video system 110 that is very similar to the actual configuration of video system 110.

In the present embodiment, GUI 300 includes a set of GUI elements (301, 302, 303, 304, 305, 306, 309, 312, 313 and 315) that provide a visual representation of the various source nodes and target nodes of video system 110. For example, GUI element (nodal element) 301 indicates tuner I/F 1 of FIG. 1. In this embodiment, GUI 300 also includes a set of GUI elements (exemplified by element 330) that provide a visual representation of the circuitry of video system 110. For example, GUI element 330 represents the circuitry downstream of switch 6 of FIG. 1. Furthermore, according to the present embodiment, GUI 300 includes a set of GUI elements (307, 308 and 310) that provide a visual representation of the switches of video system 110. Thus, for example, GUI element 307 represents switch 17 of FIG. 1.

Referring to FIGS. 1 and 3, the elements of GUI 300 are selected using remote commander 50. This can be accomplished in several different ways. For example, using a button on remote commander 50, GUI 300 can be automatically summoned and displayed on CRT 15. One of the GUI elements (e.g., element 303) is selected and highlighted (that is, the GUI element is active). When active, the GUI element can be manipulated by the user, as described further below. Should the user want to manipulate a different GUI element, the user can select (highlight) that element by moving to that GUI element using remote commander 50. For example, by depressing a button on remote commander 50, the user can scroll through the various GUI elements using a round-robin type of approach. Alternatively, GUI 300 can include an interface that allows the user to directly select a particular GUI element.

Continuing with reference to FIGS. 1 and 3, the use of GUI 300 is described by way of example. Upon selection of GUI element 301 (representing tuner I/F 1), pop-up menu 350 appears, as exemplified in FIG. 4. Note that, prior to user selection of GUI element 301, this element would identify by name the input node with which it is associated; that is, GUI element 301 would include the name "Tuner 1" in much the same way GUI element 302 includes the name "Video 2."

Figure 4:
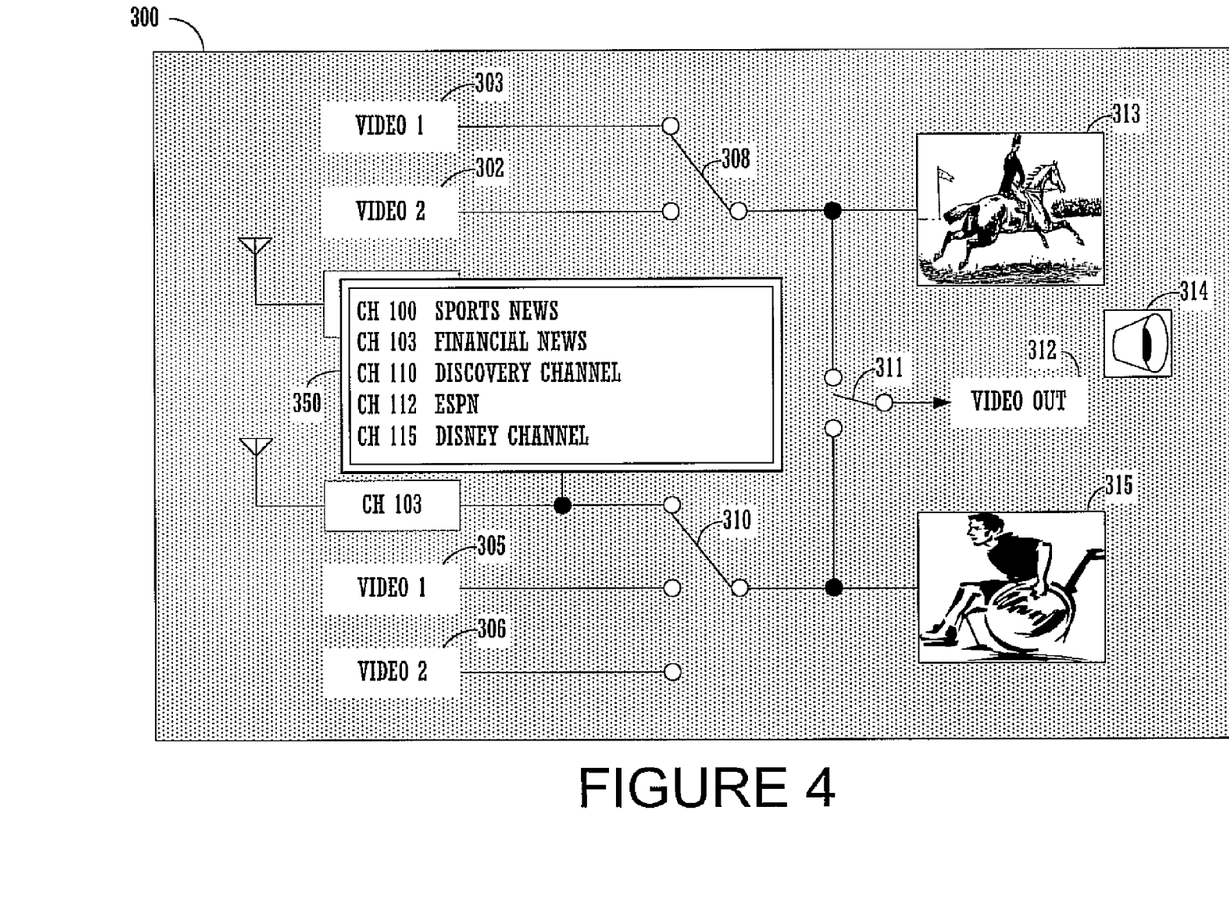
FIG. 4 illustrates the graphical user interface of FIG. 3 in practice according to one embodiment of the present invention.

With further reference to FIG. 4, pop-up menu 350 shows the programs being received via tuner I/F 1 of FIG. 1; that is, pop-up menu shows the channels and/or programs being received via cable, an antenna, a satellite system, or the like. It is appreciated that, in the example illustrated by FIG. 4, only a partial list of channels/programs is shown; alternatively, a complete list of available channels/programs can be provided by pop-up menu 350. Upon selection by the user of one of the channels or programs, pop-up menu 350 disappears from view.

With reference now to FIGS. 1 and 3, the user makes a selection of one of the channels from tuner I/F 1 (channel 100 is selected as an example). According to the present embodiment, the channel selected by the user is now indicated in GUI element 301. In a similar manner, the user can select a channel from tuner I/F 2, in which case GUI element 304 would indicate the selected channel (channel 103 is selected as an example). In the present embodiment, in order to direct the various inputs to the desired target nodes, the user next selects and manipulates the various GUI elements representing the switches. In the example of FIG. 3, the user can select GUI element 307 to direct the signal from tuner I/F 1 (represented by GUI element 301) to TV output port 36 (represented by GUI element 309). In the present embodiment, this is accomplished by the user highlighting (selecting) GUI element 307 and then using a button on remote commander 50 to cause GUI element 307 to toggle back and forth between its possible positions. The user similarly selects and manipulates the other GUI elements to route the signals between source and destination nodes as desired.

In the present embodiment, as the user selects and manipulates the various GUI elements as described above, CPU 10 sets the switches in video system 110 in response. Consider the example of FIG. 3. With the switches set as shown, CPU 10 sets the switches in video system 110 as follows:

Switch 5→position (b), input from Video 1 (31);
Switch 6→position (a), input from tuner I/F 2 (DET 4);
Switch 16→position (a), input from switch 5; and
Switch 17→position (a), input from tuner I/F 1 (DET 3).

With reference to FIG. 2, based on the example of FIG. 3, CPU sets the switches in audio system 200 as follows:

Switch 20→position (b), input from Audio 1 (33);
Switch 21→position (a), input from tuner I/F 2 (A2);
Switch 22→position (a), input from switch 20;
Switch 23→position (a), input from switch 20; and
Switch 24→position (a), input from tuner I/F 1 (A1).

According to the present embodiment of the present invention, continuing with the example illustrated by FIG. 3, the video signal from video input port 31 (Video 1, represented as GUI element 303) is displayed in GUI element 313. Had the user set GUI element 308 to the position corresponding to GUI element 301, for example, then GUI element 313 would instead display the video signal from tuner I/F 1 (e.g., channel 100). In a similar manner, the video signal from tuner I/F 2 (e.g., channel 103) is displayed using GUI element 315.

In the present embodiment, GUI element 314 indicates which input node is providing the audio signal currently in use. GUI element 314 functions essentially as a toggle that can be moved from the proximity of GUI element 313 to the proximity of GUI element 315, and back again. In the example of FIG. 3, by its proximity to GUI element 313, GUI element 314 indicates that the audio signal associated with the video signal identified by GUI element 313 (e.g., the audio signal from Video 1) is being used.

GUI element 314 can also be used to indicate which video signal is selected for viewing. That is, GUI elements 313 and 315 provide a preview of some of the options available for viewing, and GUI element 314 can be used to indicate which option has been selected. Alternatively, another GUI element can be used to indicate the selected option. It is understood that, although GUI element 314 is depicted as a loudspeaker, a different image or icon can be used.

Continuing with reference to FIGS. 1 and 3, in one embodiment, the GUI elements representing the circuitry of video system 110 (as exemplified by GUI element 330) can be animated to indicate signal flows within video system 110. In one embodiment, flashing arrows can be used to indicate the various signal flows. For example, GUI element 330 can be animated using flashing arrows to show the signal flow from tuner I/F 2 (GUI element 314) to GUI element 315.

In another embodiment, user-friendly names for the source and target nodes of GUI 300 can be defined by the user and these user-friendly names can be included in the appropriate GUI element. For example, instead of identifying GUI element 303 as "Video 1," a user can instead assign the name DVD player to GUI element 303. Alternatively, the GUI element can incorporate an image recognizable as a DVD player, for example.

As described above, the number of GUI elements corresponding to the source and target nodes can vary according to the number of peripheral devices coupled to video system 110. In one embodiment, peripheral devices coupled to video system 110 are automatically detected, and GUI elements for each of the detected devices are automatically generated and rendered. In another embodiment, when a node is not connected to a device (e.g., if video input port 32 is not being used), then a GUI element for that node is not rendered, or is grayed out.

Thus, in its various embodiments, the present invention provides a user-friendly GUI that allows a user to readily visualize which source nodes are coupled to which target nodes. Embodiments of the present invention also provide a GUI that enables a user to readily select different source and/or target nodes, and to just as readily switch from one source to another and/or from one target to another. Thus, the present invention provides a ready means for users to control the audio and video signal flows within a television, set top box, or the like. The present invention is flexible enough to be used for a range of devices that have varying numbers of input and target nodes. Embodiments of the present invention can be implemented in software and, as such, the present invention is also well-suited to different hardware configurations, including those used by legacy devices.

Figure 5:
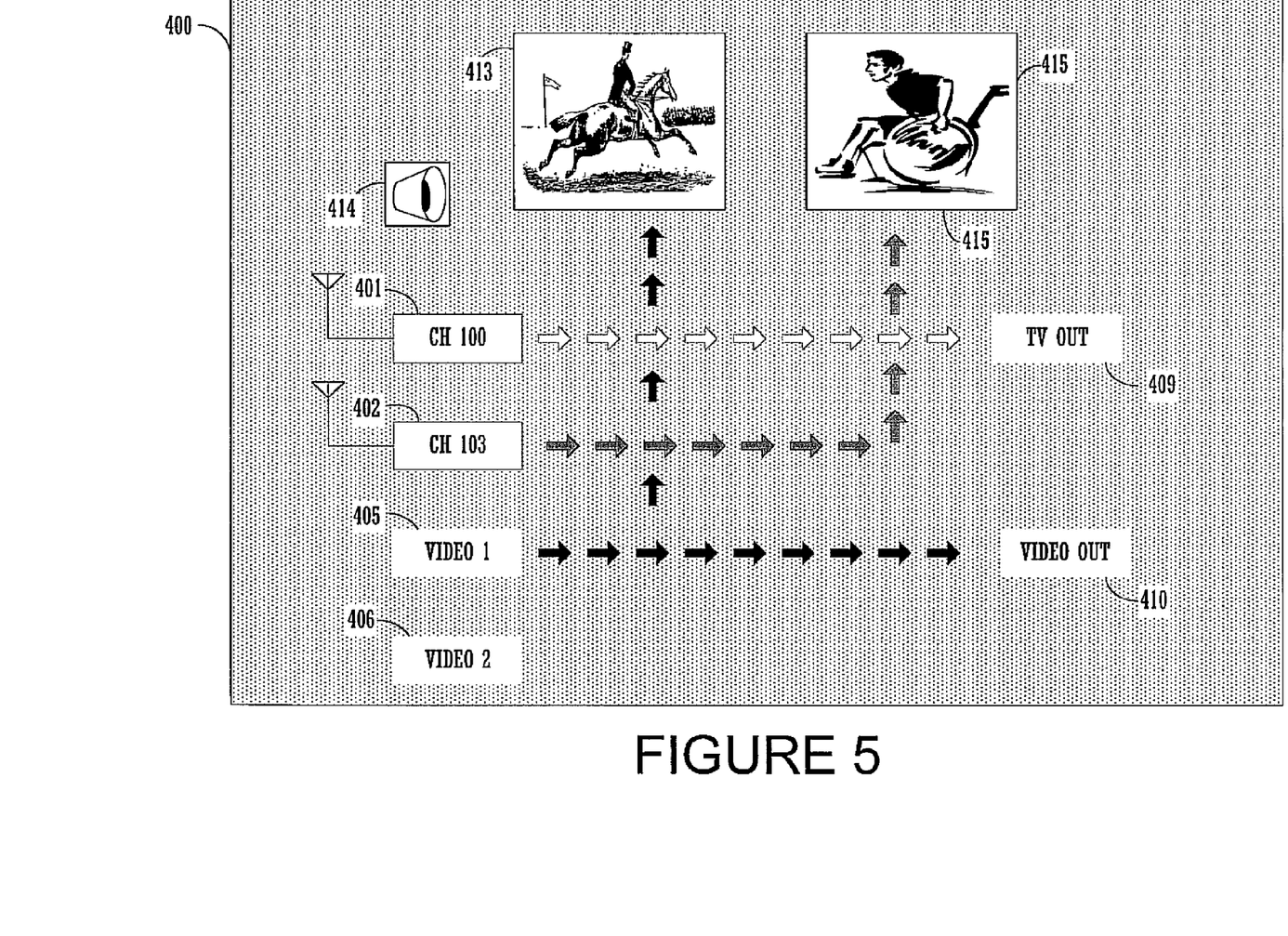
FIG. 5 illustrates another embodiment of a graphical user interface in accordance with the present invention.

FIG. 5 illustrates another embodiment of a graphical user interface 400 in accordance with the present invention. In the present embodiment, GUI 400 is implemented in software as computer-readable and computer-executable instructions executed by a processor (e.g., CPU 10 of FIG. 1). The computer-readable and computer-executable instructions may reside in memory 20 of FIG. 1. However, it is understood that the computer-readable and computer-executable instructions may instead reside in a memory device and/or may be executed by a processor separate from, but coupled to, video system 110 of FIG. 1.

With reference to FIG. 5, in the present embodiment, GUI 400 provides a representation of the signal flows between the various elements of a video system such as video system 110 of FIG. 1. In the embodiment of FIG. 5, with reference also to FIG. 1, GUI 400 includes GUI element 401 representing tuner I/F 1, GUI element 402 representing tuner I/F 2, and GUI elements 405 and 406, representing video input nodes 31 and 32, respectively. Similarly, GUI element 409 represents TV output port 36 and GUI element 410 represents video output port 35. In this embodiment, GUI element 413 represents switch 5 and GUI element 415 represents switch 6.

Figure 6:
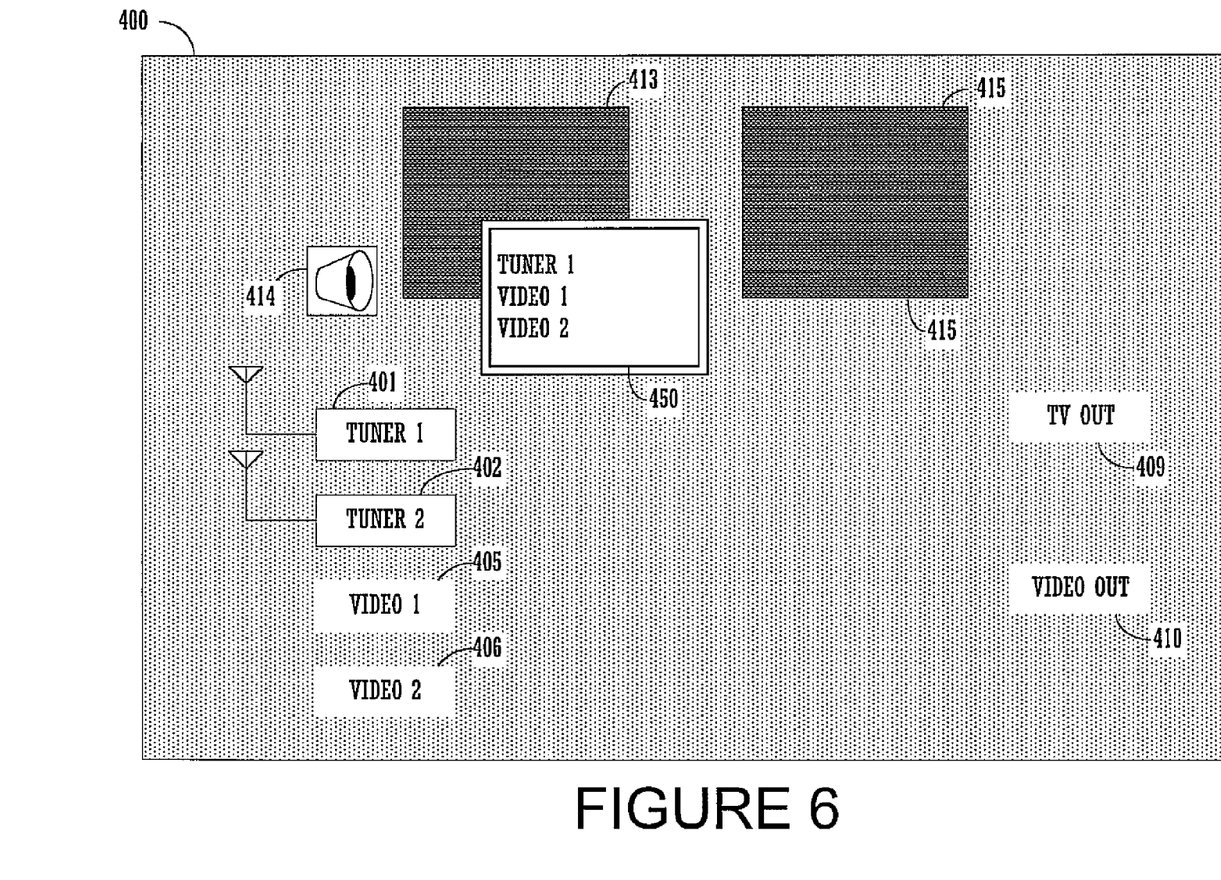
FIG. 6 illustrates the graphical user interface of FIG. 5 in practice according to one embodiment of the present invention.

In the present embodiment, GUI 400 is used as follows. By selecting (highlighting) a GUI element, a pop-up menu appears, exemplified by pop-up menu 450 of FIG. 6. The items in the pop-up menu include a list of video signals that are available at the node corresponding to the selected GUI element. Thus, for example, pop-up menu 450 lists the inputs to switch 5 of FIG. 1: tuner I/F 1 (Tuner 1), video input port 31 (Video 1), and video input port 32 (Video 2). Similarly, continuing with reference to FIGS. 1 and 6, a pop-up menu for GUI element 415 would contain the inputs to switch 6 (tuner I/F 2, video input port 31, and video input port 32), a pop-up menu for GUI element 409 would contain the inputs to switch 17 (tuner I/F 1 and tuner I/F 2), and a pop-up menu for GUI element 410 would contain the inputs to either switch 5 or switch 6, depending on the position of switch 16. In the present embodiment, the user sets the positions of the various switches by selecting from the choices provided by GUI elements 409, 410, 413 and 415. Thus, for example, if the user selects Tuner 1 from pop-up menu 450, then switch 5 is set to position (a) by CPU 10.

With the switches of video system 110 (FIG. 1) set as in the example of FIG. 3, GUI 400 will appear as shown in FIG. 5. According to this example, with reference to FIGS. 1 and 5, the output of tuner I/F 1 (represented by GUI element 401) will go to switch 17 (represented by GUI element 409). The output of tuner I/F 2 (GUI element 402) will go to switch 6 (GUI element 415). The signal from video input node 31 (GUI element 405) goes to switch 5 (GUI element 413) and switch 16 (GUI element 410). In one embodiment, the signal flows between the source and target nodes are illustrated in GUI 400 by arrows of different colors, so that the signal flows may be readily distinguishable from one another. A GUI element 414, illustrated as a loudspeaker icon placed in proximity to one of the GUI elements, is used to show which audio signal is being used; in the example of FIG. 5, the proximity of GUI element 414 to GUI element 413 indicates that the audio from video input node 31 (Video 1) is currently being used. GUI element 414 functions as a toggle as described above. It is appreciated that other types of GUI elements may be used in accordance with the present invention.

In contrast to GUI 300 of FIG. 3, GUI 400 does not include GUI elements for the circuitry and for the switches, and only shows the signal flows between GUI elements. As such, GUI 400 is readily scaleable to larger or more complicated video systems that may use additional switches.

Figure 7:
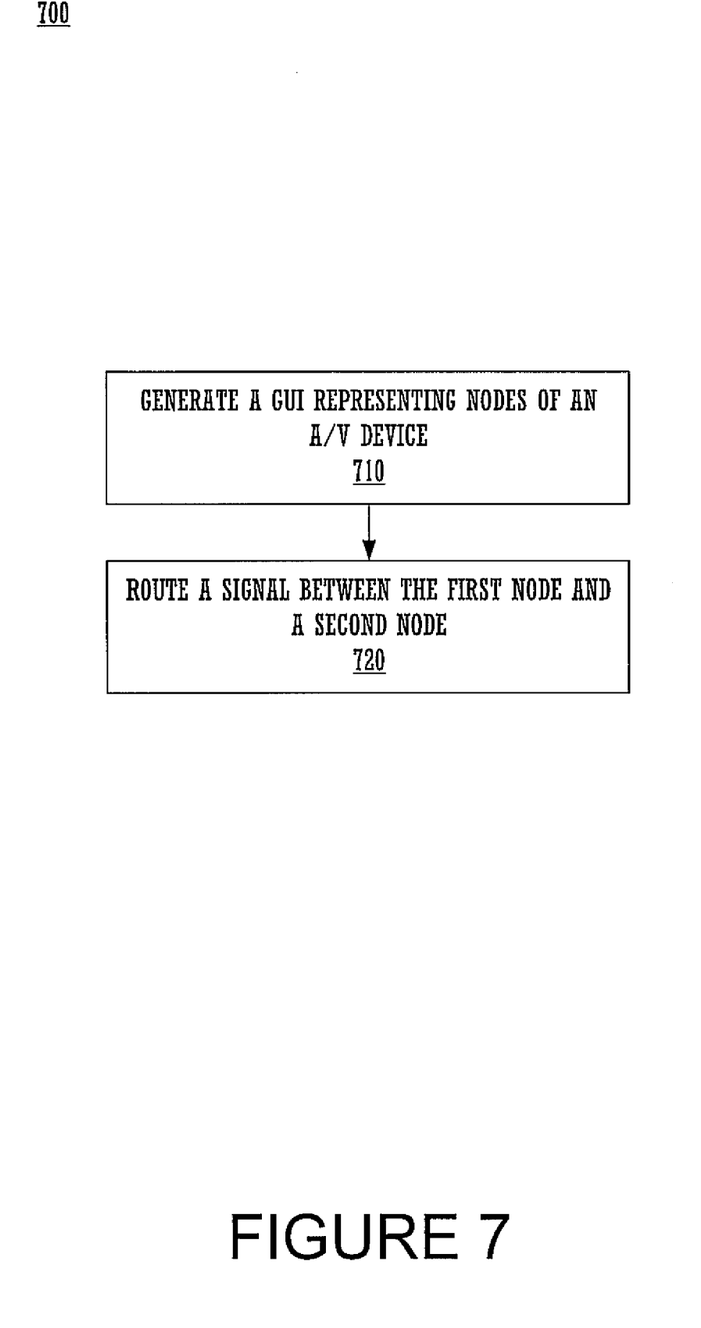
FIG. 7 is a flowchart of a process for controlling signals in a device according to one embodiment of the present invention.

FIG. 7 is a flowchart 700 of a process for controlling signals according to one embodiment of the present invention. Flowchart 700 includes processes of the present invention that, in one embodiment, are carried out by a processor (e.g. processor 10 of FIG. 1) under the control of computer-readable and computer-executable instructions. The computer-readable and computer-executable instructions reside, for example, in data storage features such as computer usable volatile memory, computer usable non-volatile memory, and/or a data storage device (e.g., memory 20 of FIG. 1).

In step 710 of FIG. 7, a GUI representing the source and target nodes of an audio/video device is generated. In one embodiment, the GUI is exemplified by GUI 300 of FIG. 3, and in another embodiment, the GUI is exemplified by GUI 400 of FIG. 5.

In step 720 of FIG. 7, in response to user input, a signal is caused to be routed between a first node and a second node. In the embodiment exemplified by FIG. 3, the user manipulates the various GUI elements representing the switches within an audio/video device; in response to the user input, the appropriate switches of the audio/video device are automatically set so that a signal is routed between the first and second nodes. In the embodiment exemplified by FIG. 5, the user selects a particular GUI element and is presented with a list of signals being provided to the node corresponding to the selected GUI element. That is, upon user selection of a target node, a list of source nodes providing input to that target node is displayed. In response to user selection of one of the source nodes (or one of the signals), the appropriate switches are automatically set so that a signal is routed between the source and target nodes.

The preferred embodiments of the present invention, a graphical user interface for a device having multiple input and output nodes, are thus described. While the present invention has been described in particular embodiments, it should be appreciated that the present invention should not be construed as limited by such embodiments, but rather construed according to the following claims.

What is claimed is:

1. A method of controlling signals within an audio/video device, said method comprising:
   automatically detecting peripheral devices coupled to source nodes and target nodes of said audio/video device;
   generating a display comprising a graphical user interface (GUI) comprising a plurality of displayed GUI elements that represent said source nodes and said target nodes and connection paths between said source nodes and said target nodes, wherein said plurality of displayed GUI elements includes a first subset containing only said source nodes that are coupled to said peripheral devices and wherein said plurality of displayed GUI elements also includes a second subset containing only said target nodes that are coupled to said peripheral devices, wherein said plurality of displayed GUI elements also includes a subset of said connection paths containing only said connection paths that are possible between said first subset of source nodes and said second subset of target nodes, said GUI further comprising a first GUI element useful for displaying a first video signal associated with a first source node of said source nodes, wherein said first video signal is displayed in said first GUI element; and
   routing a signal between a first node and a second node by manipulating circuitry within said audio/video device in response to user input.

2. The method of claim 1 wherein said GUI comprises a topographical rendering of said first and second subsets of nodes and said subset of connection paths.

3. The method of claim 1 wherein said GUI further comprises a representation of said circuitry.

4. The method of claim 1 wherein said circuitry comprises switches, wherein said user input further comprises manipulation of GUI elements representing said switches, wherein said GUI elements representing said switches include a second GUI element, wherein said second GUI element is moveable from a first position to a second position, wherein in said first position said second GUI element is connected to a GUI element representing said first source node, and wherein in said second position said second GUI element is connected to a GUI element representing a second source node.

5. The method of claim 1 wherein said audio/video device is a television.

6. The method of claim 1 wherein said audio/video device is a set top box.

7. The method of claim 1 comprising:
   detecting another device coupled to said audio/video device; and
   rendering a GUI element for each device detected.

8. The method of claim 1 wherein a GUI element comprises a user-friendly name for another device coupled to said audio/video device.

9. The method of claim 1 wherein said method comprises:
   rendering on said GUI a visual representation of said signal routed within said audio/video device between said first node and said second node.

10. The method of claim 1 wherein said GUI comprises a second GUI element useful for displaying a second video signal associated with a second source node of said source nodes, wherein said second video signal is displayed in said second GUI element.

11. The method of claim 10 wherein audio content associated with one of said first and second source nodes is selected, wherein said GUI comprises a GUI element indicating which of said first and second source nodes is associated with said audio content.

12. The method of claim 10 comprising:
   receiving user input comprising a selection of a GUI element; and
   listing input signals being provided to a node corresponding to said GUI element.

13. A display device having rendered thereon a graphical user interface (GUI), said GUI comprising:
   first GUI elements providing a visual representation of source nodes and target nodes of an audio/video device and connection paths between said source nodes and said target nodes, wherein said first GUI elements include a first subset consisting of GUI elements for only said source nodes that are coupled to peripheral devices and wherein said first GUI elements also include a second subset consisting of GUI elements for only said target nodes that are coupled to said peripheral devices, wherein said peripheral devices are automatically detected by said audio/video device, wherein said first GUI elements also include a subset of said connection paths consisting of only actual connections in said audio/video device that are possible between said first subset of said source nodes and said second subset of said target nodes, wherein user input causes a signal to be routed between a first node in said audio/video device and a second node in said audio/video device, wherein said signal is routed by manipulating circuitry within said audio/video device;
   second GUI elements providing a visual representation of signals routed within said audio/video device between said first and second nodes along one of said connection paths; and a third GUI element useful for displaying a first video signal associated with a first source node of said source nodes, wherein said first video signal is displayable in said third GUI element.

14. The display device of claim 13 wherein said first GUI elements comprise a topographical rendering of said first subset of said source nodes, said second subset of said target nodes and subset of said connection paths.

15. The display device of claim 13 wherein said second GUI elements also provide a visual representation of said circuitry.

16. The display device of claim 15 wherein said second GUI elements also provide a visual representation of switches, wherein said user input further comprises manipulation of said second GUI elements, wherein said manipulation causes said signals to be routed between said first and second nodes, wherein said second GUI elements representing said switches include a switch-like GUI element, wherein said switch-like GUI element is moveable from a first position to a second position, wherein in said first position said switch-like GUI element is connected to a GUI element representing said first source node, and wherein in said second position said switch-like GUI element is connected to a GUI element representing a second source node.

17. The display device of claim 13 wherein said audio/video device is a television or a set top box.

18. The display device of claim 13 wherein said audio/video device is operable for detecting another device coupled to said audio/video device, wherein a first GUI element is rendered for each device detected.

19. The display device of claim 13 wherein said first GUI elements comprise a user-friendly name for other devices coupled to said audio/video device.

20. The display device of claim 13 comprising:
a fourth GUI element useful for displaying a second video signal associated with a second source node of said source nodes, said third and fourth GUI elements displayable simultaneously, wherein said second video signal is displayable in said fourth GUI element.

21. The display device of claim 20 wherein audio content associated with one of said first and second source nodes is selected, wherein said GUI comprises a fifth GUI element indicating which of said first and second source nodes is associated with said audio content.

22. The display device of claim 13 wherein said first GUI elements comprise a list of input signals being provided to a respective node, wherein said list is displayed in response to user selection of a GUI element corresponding to said respective node.

23. An audio/video device comprising:
internal circuitry;
a display device coupled to said internal circuitry;
a first set of nodes coupled to said internal circuitry, said first set of nodes couplable to sources of video content;
a second set of nodes coupled to said internal circuitry, said second set of nodes providing a destination for said video content;
wherein a graphical user interface (GUI) is generated on said display device, said GUI comprising:
nodal GUI elements providing a visual representation of said first set of source nodes and said second set of target nodes, wherein said nodal GUI elements include a first subset of nodal GUI elements representing only said source nodes that are coupled to peripheral devices and a second subset of nodal GUI elements representing only said target nodes that are coupled to said peripheral devices, wherein said peripheral devices are automatically detected by said audio/video device, wherein user input causes a signal to be routed between a first node selected from said first set of nodes and a second node selected from said second set of nodes, wherein said signal is routed by manipulating said internal circuitry;
flow GUI elements providing a visual representation of signals routed along connection paths between said first subset of source nodes and said second subset of target nodes, wherein only a subset of said connection paths that includes actual connection paths that are possible within said audio/video device between nodal GUI elements that are members of said first and second subsets are displayed; and
a first display GUI element useful for displaying a first video signal associated with said first node, wherein said first video signal is displayable in said first display GUI element.

24. The audio/video device of claim 23 wherein said GUI comprises a topographical rendering of said first and said second subsets of nodal GUI elements and said subset of connection paths.

25. The audio/video device of claim 23 wherein said GUI comprises:
circuit GUI elements providing a visual representation of said internal circuitry.

26. The audio/video device of claim 25 wherein said circuit GUI elements comprise representations of switches, wherein said user input further comprises manipulation of said representations of said switches, wherein said representation of said switches includes a switch-like GUI element, wherein said switch-like GUI element is moveable from a first position to a second position, wherein in said first position said switch-like GUI element is connected to a GUI element representing a first source node of said first set of nodes, and wherein in said second position said switch-like GUI element is connected to a GUI element representing a second source node of said second set of nodes.

27. The audio/video device of claim 23 wherein said audio/video device is a television or a set top box.

28. The audio/video device of claim 23 wherein a nodal GUI element comprises a user-friendly name for a device coupled to said audio/video device.

29. The audio/video device of claim 23 wherein said GUI comprises:
a second display GUI element useful for displaying a second video signal associated with a second one of said source nodes, said first and second display GUI elements displayable simultaneously, wherein said second video signal is displayable in said second display GUI element.

30. The audio/video device of claim 29 wherein audio content associated with one of said source nodes is selected, wherein said GUI comprises an element indicating which of said source nodes is associated with said audio content.

31. The audio/video device of claim 23 wherein said nodal GUI elements comprise a list of input signals being provided to a respective node, wherein said list is displayed in response to user selection of a nodal GUI element corresponding to said respective node.

* * * * *